Jan. 7, 1930. F. H. BRUNDAGE 1,742,645
FISHING ROD AND REEL
Filed Aug. 13, 1928
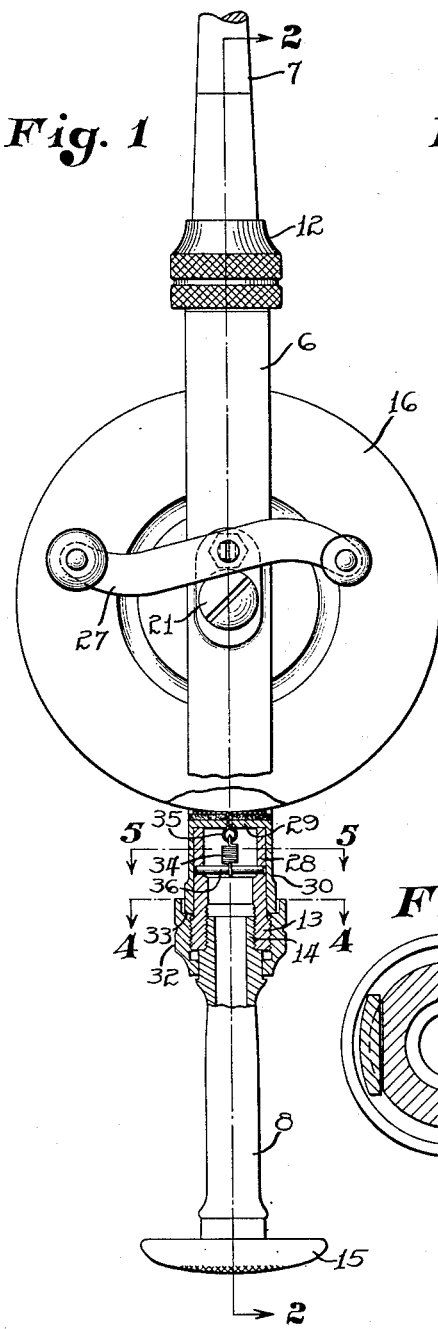
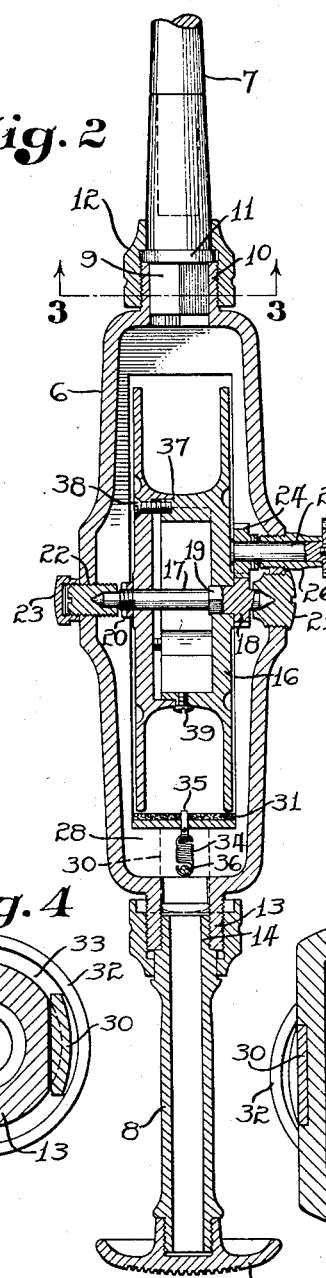
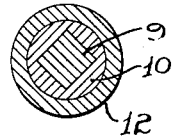
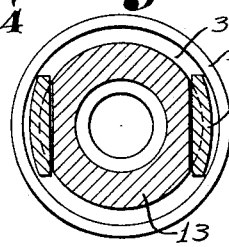
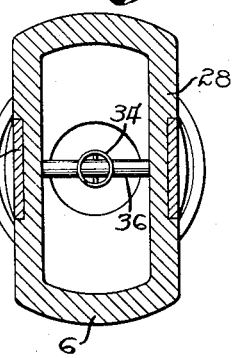
Inventor
Forrest H. Brundage,
By Owen & Owen,
Attorneys Patented Jan. 7, 1930

1,742,645

UNITED STATES PATENT OFFICE

FORREST HOFFMAN BRUNDAGE, OF TOLEDO, OHIO

FISHING ROD AND REEL

Application filed August 13, 1928. Serial No. 299,158.

This invention relates to a fishing rod and reel which are more especially adapted for use in deep sea fishing for catching fish of considerable size.

One of the important objects of the invention is to provide an improved brake for the reel, which may be adjusted, by very simple means, to resist the paying out of the line as much or as little as may be desired. This adjustable means is adapted to be grasped by the hand, and by a very slight motion, it may be continuously adjusted, in accordance with the action of the fish, either to exert the desired retardant force, or to allow the reel to rotate freely when the line is reeled in.

The invention also includes an improvement in the reel itself, as well as other features of improved construction, which will be more particularly explained in connection with the accompanying drawings, illustrating the preferred embodiment thereof.

In the drawings, Figure 1 is a side elevation of the invention, with parts broken away and shown in section.

Fig. 2 is a longitudinal section taken on the line 2—2 of Fig. 1.

Fig. 3 is a transverse section taken on the line 3—3 of Fig. 2.

Fig. 4 is a transverse section taken on the line 4—4 of Fig. 1.

Fig. 5 is a transverse section taken on the line 5—5 of Fig. 1.

In the present embodiment of the invention, as illustrated in the drawings, the mounting for the reel comprises a yoke 6, with a rod 7 secured to one end thereof and a butt 8 secured to the other end. The rod 7 may be of wood or other suitable material, and is provided at its rear end with a noncircular portion 9 adapted to fit in a correspondingly shaped socket 10 formed in the end of the yoke 6. A flange 11 is also provided at the base of the non-circular portion 9 and is adapted to be clamped against the end of the socket 10 by a barrel 12 which is in threaded engagement with the socket. The arms of the yoke 6 are integrally connected at their rear ends to a rearwardly extending nipple 13 which is internally threaded to receive the correspondingly threaded end 14 of the butt 8. The butt 8 is made preferably from metal, tubular in form, and has a head 15 secured to its rear end, which may be held firmly against a person's body.

The reel 16 is secured to a spindle 17, which has a gear 18 integrally or otherwise secured thereon adjacent one side of the reel. In order that the reel may be conveniently secured to the spindle, the latter is formed adjacent the gear 18 with a noncircular portion 19 adapted to fit in a correspondingly shaped socket in one side of the reel, the spindle being secured at its other end by a nut 22. The spindle 17 is rotatably mounted in suitable bearing members 21 and 22 which are secured in the respective legs of the yoke 6, the bearing member 22 being adjustable and secured in its adjusted position by a lock nut 23.

For rotating the reel 16, the gear 18 meshes with a gear 24 secured to a short spindle 25 which is rotatably mounted within a bearing sleeve 26 secured to the yoke 6. A hand crank 27 is secured to the outer end of the spindle 25. This hand crank is preferably double, one end being longer than the other end so as to afford a greater leverage.

At the rear end of the yoke 6, in front of the nipple 13, the legs of the yoke are connected by webs 28, the free edges of which constitute a seat for the brake member 29. This brake member is U-shaped, with its legs 30 slidably mounted in longitudinal channels formed in the webs 28. The front face of the brake member 29 may be covered with a facing 31 of rubber or similar material adapted to engage the periphery of the reel 16. The convex surface of the nipple 13 is threaded to receive an internally threaded barrel 32 which is formed with an annular shoulder 33 adapted to engage the ends of the legs 30 and to force the brake into engagement with the reel, when the barrel is advanced. When the barrel is retracted, the brake is withdrawn by means of a spring 34 connected at one end to the brake by means of a clip 35 and connected at the other end to a pin 36 secured between the webs 28. The legs of the yoke, the webs 28 and the brake member 29 constitute a housing within which the spring 34 and the pin 36 are contained.

The reel 16 is preferably made from light metal, in two parts, which are fitted together on the line indicated at 37 substantially in a plane perpendicular to the axis of the reel, the two parts being sweat together and secured by screws 38. By making the reel in this manner, the two parts may be cored out, so that they form a hollow shell when assembled. A screw 39 is mounted in the bottom of the groove in the reel so that one end of the line may be secured thereto.

In controlling the operation of the reel, only a partial rotation of the barrel 32 is necessary in order to cause the brake to bear with any desired pressure upon the periphery of the reel, or to retract the same so as to clear the reel altogether. It is also very easy to vary the braking action continuously as may be desired in playing the fish.

While I have shown and described the invention in considerable detail, it is to be understood that this is merely for the purpose of illustration and that the same be modified to a considerable extent without any material departure from the scope of the invention as claimed.

What I claim is:

1. The combination with a fishing reel and a yoke in which the reel is rotatably mounted, of a U-shaped brake member, said yoke having longitudinal channels near one end in which the legs of said brake member are guided for sliding movement, a spring tending to move the brake away from the reel, and screw threaded means associated with said legs to advance the brake, in opposition to said spring, into frictional engagement with the periphery of the reel.

2. The combination with a fishing reel and a yoke in which the reel is rotatably mounted, of a U-shaped brake member, said yoke having longitudinal channels near one end in which the legs of said brake member are guided for sliding movement, and a barrel in threaded engagement with the end of the yoke and rotatable to control the movement of the brake into or out of frictional engagement with the periphery of the reel.

3. The combination with a fishing reel and a yoke in which the reel is rotatably mounted, of a U-shaped brake member, said yoke having longitudinal channels near one end in which the legs of said brake member are guided for sliding movement, a spring tending to move the brake away from the reel, a barrel in threaded engagement with the end of the yoke, and an annular internal shoulder on said barrel engageable with the legs of the brake member to advance the brake in opposition to said spring, as the barrel advances, into frictional engagement with the periphery of the reel.

4. The combination with a fishing reel, of a yoke having arms, between which the reel is rotatably mounted, and a threaded end portion connected to said arms, spaced webs also connecting said arms adjacent the threaded end portion and having longitudinal channels therein, a U-shaped brake member having legs straddling said webs and guided in said channels, a spring tending to move the brake away from the reel, said webs, brake member and the end portion of the yoke constituting a housing for said spring, and means associated with the threaded end portion to advance the brake, in opposition to said spring, into frictional engagement with the periphery of the reel.

In testimony whereof I have hereunto signed my name to this specification.

FORREST HOFFMAN BRUNDAGE.